United States Patent
Meyer et al.

(10) Patent No.: US 10,279,514 B2
(45) Date of Patent: May 7, 2019

(54) RELATING TO FOAM FILLED HONEYCOMB STRUCTURES

(71) Applicant: Zephyros, Inc., Romeo, MI (US)

(72) Inventors: Francis Meyer, Molsheim (FR); Morgan Chene, Molsheim (FR)

(73) Assignee: Zephyros, Inc., Romeo, MI (US)

( * ) Notice: Subject to any disclaimer, the term of this patent is extended or adjusted under 35 U.S.C. 154(b) by 268 days.

(21) Appl. No.: 15/030,618

(22) PCT Filed: Oct. 20, 2014

(86) PCT No.: PCT/IB2014/065470
§ 371 (c)(1),
(2) Date: Apr. 20, 2016

(87) PCT Pub. No.: WO2015/059622
PCT Pub. Date: Apr. 30, 2015

(65) Prior Publication Data
US 2016/0243733 A1    Aug. 25, 2016

(30) Foreign Application Priority Data
Oct. 21, 2013  (GB) .................................. 1318587.1

(51) Int. Cl.
*C04B 38/00*    (2006.01)
*B29C 44/18*    (2006.01)
(Continued)

(52) U.S. Cl.
CPC .......... *B29C 44/186* (2013.01); *B29C 44/445* (2013.01); *B32B 3/12* (2013.01); *B32B 27/065* (2013.01); *B32B 27/08* (2013.01); *B32B 27/20* (2013.01); *B32B 27/38* (2013.01); *C08J 9/10* (2013.01); *C08J 9/232* (2013.01); *B29K 2063/00* (2013.01); *B29K 2105/0005* (2013.01); *B29K 2105/0872* (2013.01); *B29L 2031/608* (2013.01); *B32B 2250/40* (2013.01); *B32B 2305/022* (2013.01); *B32B 2305/024* (2013.01); *B32B 2307/3065* (2013.01);
(Continued)

(58) Field of Classification Search
USPC .................................................. 428/116, 117
See application file for complete search history.

(56) References Cited

U.S. PATENT DOCUMENTS 4,433,068 A * 2/1984 Long .......................... C08J 9/24
521/54
5,274,006 A * 12/1993 Kagoshima ................ C08J 9/06
521/104

(Continued)

*Primary Examiner* — Lauren R Colgan
(74) *Attorney, Agent, or Firm* — The Dobrusin Law Firm, PC

(57) ABSTRACT

Spherical heat foamable pellets (2) are used for reinforcing honeycomb structures (4). The pellets are preferably of average diameter from 0.5 mm to 0.9 mm and preferably at least 80% of the pellets have a diameter in this range. The pellets can form a free flowing stream which can be poured into the cells (5) of the honeycomb where they can be foamed by heating to form a reinforcing foam which can also bond the honeycomb structure to facing sheets. It is preferred that the pellets are based on a thermosetting resin and contain a curing agent that can cure the foamed resin to produce an integral rigid reinforcing foam within the cells of the honeycomb.

13 Claims, 3 Drawing Sheets

(51) Int. Cl.
*B29C 44/44* (2006.01)
*C08J 9/10* (2006.01)
*C08J 9/232* (2006.01)
*B32B 27/06* (2006.01)
*B32B 27/08* (2006.01)
*B32B 27/20* (2006.01)
*B32B 27/38* (2006.01)
*B32B 3/12* (2006.01)
*B29K 63/00* (2006.01)
*B29L 31/60* (2006.01)
*B29K 105/00* (2006.01)
*B29K 105/08* (2006.01)

(52) U.S. Cl.
CPC ... *B32B 2307/558* (2013.01); *B32B 2307/702* (2013.01); *B32B 2605/18* (2013.01); *C08J 2203/04* (2013.01); *C08J 2207/00* (2013.01); *C08J 2300/24* (2013.01); *C08J 2363/00* (2013.01); *C08J 2363/02* (2013.01)

(56) References Cited

U.S. PATENT DOCUMENTS

| | | | |
|---|---|---|---|
| 6,635,202 B1 * | 10/2003 | Bugg | B29C 44/186 156/79 |
| 7,842,147 B2 * | 11/2010 | Shen | B29C 44/186 156/256 |
| 9,409,358 B2 * | 8/2016 | Bremmer | B29D 24/005 |
| 2008/0182067 A1 | 7/2008 | Shen et al. | |

* cited by examiner

RELATING TO FOAM FILLED HONEYCOMB STRUCTURES

The present invention relates to free flowing thermally expandable materials and their use as reinforcing materials. In particular they are useful for providing strengthening materials in the cells of honeycomb structures. The invention also relates to materials derived from thermosetting resins that may be used in the invention.

Sandwich panels comprising honeycomb structures with one or two facing panels are well known and have widespread use to provide high strength, particularly strength and modulus at light weight. The honeycombs themselves may be made of any suitable materials such as metals such as aluminium or resin impregnated papers such as the Nomex materials available from the Hexcel Corporation.

For many applications the honeycomb structures are provided with one or more surface skins which may again be of many materials. Examples include metals again such as steel or aluminium, glass woven or unwoven mat, paper and fibre reinforced thermoset resins derived from thermohardenable resins such as epoxy resins, polyester resins and polyurethane resins or wood. It is important in these structures that the honeycomb structure be securely bonded to the facing skin which is usually accomplished by means of an adhesive. Where the honeycomb material and/or the skin material themselves are based on thermohardenable material, the adhesive can be selected to be thermosetting in the temperature range employed to harden the honeycomb and/or the skin materials.

The invention is particularly concerned with panels useful in the interior of aircraft such as interior parts including interior ceiling panels, interior side wall panels, transition panels, partitions, overhead bin doors, and galley structures. Additionally they may be used as structural parts such as the reinforcing shells for jet engines. These panels comprise a honeycomb structure between two facing sheets. These products are usually produced by laying up the facing sheets, optionally a heat activated adhesive and the honeycomb structure and heating in a press, an autoclave or an oven to bond the layers together. It would be beneficial to be able to produce panels having increased strength using the conventional panel manufacturing process. Increased strength may be required across the whole of a honeycomb panel. Alternatively local reinforcement may be required at positions where attachments to the honeycomb such as hinges, locks and handles are provided which are frequently areas of weakness.

One technique for the provision of panels providing strength is to provide a panel having facing sheets which may be pre-pregs and a strengthening foamed core between the sheets.

More recently the compressive strength of honeycomb structures has been improved with potting compounds comprising one component non-expanding epoxy structural high temperature potting compounds of low and intermediate density. The compounds have been used for reinforcement including local reinforcement for fasteners or attachments. The materials can be applied manually by gunning or robotically. The potting materials need to be stored in a refrigerated environment. These materials suffer from the disadvantages that they are difficult to apply, they are unstable at ambient temperature and also have a high density when cured adding undesirably to the weight of the honeycomb structures. The present invention provides an easy to use replacement for such potting compounds providing good strength and less weight.

It has been proposed to fill the cells of honeycomb structures with foamed materials which may be to achieve increased strength. For example EP 0514632 relates to sifting powdered foamable polyamide precursor into the cells of a honeycomb which is placed on a release coated sheet. When the foamable precursor is in place the other surface of the honeycomb is covered with another release coating covering the other surface and the system is heated to cause foaming and optionally further heating to cure the resin and adhere to the facing sheets.

U.S. Pat. No. 6,635,202 describes using free flowing thermally expanding and curing powders which are poured into the voids of honeycomb structures and then heated to cause the powder to expand, coalesce and cure. The process is used to make panels. The particles of a powder are typically of different shapes and sizes within a specified size range. Powders can be volatile and blown in air drafts. Additionally, the variation in particle size and shape may make the material difficult to pour and result in non-uniform packing within the honeycomb cells which will produce a space of unknown volume between the particles which is to be filled by the foaming including voids of different shapes and sizes leading in turn to a non-uniform foam and variations in the mechanical properties.

The thermally expanding resins used in U.S. Pat. No. 6,635,202 may be thermosetting resins containing expanding agents and curing agents so that they can be cured and foamed by heating. The materials can be obtained by the combination of solid resin in conjunction with an expanding agent and a curing agent and then powdering the mixture. Suitable resins are said to be epoxy resins, polyester resins, cyanate ester resins and polyimide resins. The powders have particle sizes between 500 and 2000 microns and there is no discussion about the shape of the particles or the particle size distribution of the particles within the powder. The Examples show that the greater the particle size of the powder the lower the density of the foam.

It is important that the materials used to create a foam within the cells of a honeycomb expand at the required temperature to produce a uniform foam structure throughout the honeycomb cell. Additionally it is important that the expansion of the material does not create sufficient force within the cells of the honeycomb to cause delamination of the facing skins or to push the facing skin away from the honeycomb structure to prevent or restrict the bonding of the two together. It is further required that the exotherm generated by the curing of the resin does not damage the honeycomb structure.

The present invention provides a free flowing foamable material capable of fulfilling these requirements and which overcomes the problems associated with systems currently used to reinforce honeycomb structures.

The invention provides the use of pellets for providing a foam within the cells of a honeycomb structure. Accordingly it provides the use of substantially spherical pellets for strengthening a sandwich panel comprising a honeycomb core wherein the pellets comprise a polymer and a thermally activated blowing agent. The size of the pellets may be selected according to the dimensions of the cells of the honeycomb structure. We prefer that average diameter of the spherical pellets is from 0.5 mm to 0.9 mm and that the polymer is a thermosetting resin and that the pellet further includes a thermally activated curing agent and we further prefer that at least 80% of the pellets have a diameter in the range 0.5 mm to 0.9 mm.

The present invention therefore further provides substantially spherical pellets of average diameter in the range of 0.5 mm to 0.9 mm and wherein the pellets comprise a thermosetting resin, a thermally activated blowing agent and a thermally activated curing agent for the thermosetting resin. We prefer that at least 80% of the pellets have a diameter in the range of 0.5 mm to 0.9 mm.

In a further embodiment of the invention provides a honeycomb structure in which at least some of the cells are filled by a foam derived by providing substantially spherical pellets comprising a polymer and a thermally activated blowing agent within the cell or cells of the honeycomb and heating to cause the pellets to foam. It is preferred that the pellets have an average diameter in the range of 0.5 to 0.9 mm.

In a further embodiment the honeycomb structure is provided with a skin or facing sheet on at least one surface, preferably on both surfaces.

The substantially spherical pellets of this invention are free flowing and can be readily poured. The invention therefore further provides a process for the production of a foam filled honeycomb structure comprising placing a honeycomb on a facing sheet delivering a stream of the pellets to within one or more cells of the honeycomb to substantially fill the one or more cells providing a facing sheet on top of the filled cell or cells of the honeycomb and heating to cause the pellets to foam and optionally cure to bond to both the honeycomb structure and the facing sheets.

During the heating and foaming the pellets will melt and form a unified structure within the cell of the honeycomb.

The pellets are preferably based on a polymer system that is non-tacky to the touch at ambient temperature. Additionally it is preferred that the blowing agent and the curing agent when used are not activated at ambient temperature. This means that the pellets are storage stable at room temperature and can be stored and transported readily without reacting and without picking up dust and dirt.

In certain applications particularly in transport industries such as the aerospace industries rigorous fire regulations are imposed on materials that are used in the industries. Reduced flammability, fire retardancy, reduction in smoke density, low heat release on burning are important for such materials. In particular materials that are used inside the pressurized section of the fuselage of an aircraft should comply with the requirements of the Federal Aviation Authority (FAA) tests for fire, smoke and toxicity FAR Part 25 § 25.853 (a) and heat release FAR Part 25 § 25.853 (d) or equivalent European Standards. Accordingly where the pellets are used in the production of materials that are used in the aerospace industry it is preferred that they contain a fire retardant. Halogen free fire retardants are preferred.

It is known to include flame and fire retardants in polymer foams and any known flame and fire retardants may be included in the pellets used in this invention. Examples of suitable flame and fire retardants include phosphorus containing compounds, metal hydrates such as magnesium or aluminium tryhydrate, various graphites including expandable graphite. The use of various combinations of retardants has also been proposed. Flame retardants tend to be solid materials of relatively high density and in order to obtain the required flame retardant properties, particularly the low heat release requirement for aircraft cabin panels, large quantities of flame retardant can be required. The particles of any fire retardants that are used are preferably finely divided.

In one embodiment the present invention therefore allows the production of a panel with fire retardant properties having a reinforcing foamed material within the panel without the need to make significant modifications to existing manufacturing techniques. The provision of the foamed material within the panel has the added benefit that it saves space.

It is preferred that the polymer used in the pellets of this invention are thermosetting resins and particularly epoxy resins.

Additional components that may be included in the formulation from which the pellets used in the invention are made include Epoxy Resins, Curing Agents, Blowing Agents, Core Shell Particles, Toughening Agents, Epoxy Elastomer Adducts, Polymers and Copolymers, Fillers and other Additives. For example low molecular weight resins, polyfunctional epoxy resins, rubbers and elastomers optionally modified with epoxy resins to provide increased toughness to the cured foam, a core shell rubber material are particularly preferred. Curing agents for epoxy resins are required optionally together with curing agent accelerators. Foaming agents are also required.

The formulations for producing the pellets used in this invention therefore preferably contain an epoxy resin in combination with elastomers and/or thermoplastics which are preferably core-shell particles. The formulations can be thermally cured and foamed to provide a foamed thermoset structure having high strength, high toughness and high temperature shear properties. In addition to the increase in higher temperature properties with improved toughness, these pellets develop adhesive properties at elevated temperature and are also characterized by high glass transition temperatures, high Youngs modulus, a desirable elongation to break and low water absorption making these compositions suitable for demanding environments that require high performance, such as in the aerospace and automotive industries. The adhesive properties are valuable in bonding to the honeycomb structure and any facing panels during curing processes used in the production of honeycomb panels.

Epoxy Resins

It is preferred that the pellets contain thermosetting resins and the preferred thermosetting resin formulations used to make the pellets are based on epoxy resins. Suitable epoxy resins are curable epoxy resins having a plurality of epoxy groups per molecule. In general, a large number of glycidyl ethers having at least about two epoxy groups per molecule are suitable as epoxy resins for the compositions used in this invention. The polyepoxides may be saturated, unsaturated, cyclic or acyclic, aliphatic, alicyclic, aromatic or heterocyclic polyepoxide compounds. Examples of suitable polyepoxides include the polyglycidyl ethers, which are prepared by reaction of epichlorohydrin or epibromohydrin with a polyphenol in the presence of alkali. Suitable polyphenols therefore are, for example, resorcinol, pyrocatechol, hydroquinone, bisphenol A (bis(4-hydroxyphenyl)-2,2-propane), bisphenol F (bis(4-hydroxyphenyl)methane), bisphenol S, bis(4-hydroxyphenyl)-1,1-isobutane, fluorene 4,4'-dihydroxybenzophenone, bis(4-hydroxyphenyl)-1,1-ethane, bisphenol Z (4,4'-Cyclohexylidenebisphenol), and 1,5-hydroxynaphthalene. In one embodiment, the epoxy resin includes EPON 828. Other suitable polyphenols which may be used as the basis for the polyglycidyl ethers are the novolac resin-type condensation products of phenol and formaldehyde or acetaldehyde which are usually liquid at ambient temperature.

Other suitable polyepoxides are the polyglycidyl ethers of polyalcohols, aminophenols or aromatic diamines. The bisphenol based epoxy resins that are liquid at room temperature generally have epoxy equivalent weights of from 150 to about 200. The epoxy resins that are solid at room temperature may also or alternatively be used and are likewise obtainable from polyphenols and epichlorohydrin and have melting point of from 45 to 130° C., preferably from 50 to 80° C. Typically, the composition may contain from about 25 to about 90 wt % (e.g., 25, 30, 35, 40, 45, 50, 55 wt %) of epoxy resin (unless otherwise stated, all concentrations set forth herein are expressed in terms of the weight percent of the component in question based on the adhesive composition as a whole). The resins may be obtained by the reaction of bisphenol A or bisphenol F and epichlorohydrin.

Where epoxy resins are used alone, they are preferably combined with suitable curing agents, and optionally other components selected from catalysts, rheology control agents, tackifiers, fillers, elastomeric toughening agents, reactive diluents, soluble thermoplastics and other additives well known to those skilled in the art. The ultimate formulation will be developed according to the foaming conditions to be employed and the properties required of the foamed pellets.

Curing Agents

Optionally the formulations contain a curing agent. By the term curing agent is meant a reactive component capable of either reacting with the polymer such as the epoxy functional group or polymerizing the epoxy functional group where an epoxy resin is used. Where the pellets are to be cured at elevated temperature, they contain one or more curing agents (hardeners) capable of accomplishing crosslinking or curing of certain of the components when the material is heated to a temperature in excess of room temperature. When used, the curing agents should not be activated at ambient temperature to ensure that the pellets are storage stable at room temperature.

Thermally-activatable or latent hardeners that may be used in the pellets of the present invention, include guanidines, substituted guanidines, substituted ureas, melamine resins, guanamine derivatives, blocked amines, aromatic amines and/or mixtures thereof. Examples of substituted guanidines are methylguanidine, dimethylguanidine, trimethylguanidine, tetramethylguanidine, methylisobiguanidine, dimethylisobiguanidine, tetramethylisobiguanidine, hexamethylisobiguanidine, heptamethylisobiguanidine and, more especially, cyanoguanidine (dicyandiamide). Representatives of suitable guanamine derivatives which may be mentioned are alkylated benzoguanamine resins, benzoguanamine resins or methoxymethylethoxy-methylbenzoguanamine. Solid, finely ground hardeners are preferred and dicyandiamide is especially suitable. Good storage stability of the composition is thereby ensured. The amount of curing agent utilized will depend upon a number of factors, including whether the curing agent acts as a catalyst or participates directly in the crosslinking of the composition, the concentration of epoxy groups and other reactive groups in the composition, the desired curing rate and so forth.

Generally, such curing agents have relatively low molecular weights and reactive functionalities which are phenolic, hydroxyl, amine, amide, or anhydride. Preferable curing agents are the monomeric and oligomeric amine functional polyarylenes wherein between the arylene groups are simple covalent bridges such as in the diaminodiphenyls, or connecting groups selected from the group consisting of alkylene of from 1-8 carbon atoms, ether, sulfone, ketone, carbonate, carboxylate, carboxamide and the like.

In one embodiment, the curing agent is a mixture of dicyandiamide (DICY) and a curing agent accelerator such as a bisurea and the composition is cured at about 120° C. In another embodiment, the amine curing agent is a diaminodiphenylsulfone (DDS) and the curing temperature is about 180° C. In certain embodiments, the curing agent is a combination of DICY and DDS.

Optionally curing agent accelerators such as substituted ureas for example dimethyl urea may also be included. The amounts of curing agents and curing agent accelerators used can vary widely depending upon the type of foam structure desired, the desired properties of the foam, the desired amount of expansion of the activatable material and the desired rate of expansion. Exemplary ranges for the curing agents when used and the optional curing agent accelerators present in the formulation range from about 0.001% by weight to about 7% by weight of the pellet forming formulation.

Blowing Agent

One or more blowing agents are included in the formulation from which the pellets used in this invention are derived. The blowing agents produce inert gasses when heated that convert the pellets to an open and/or closed cellular structure. The foamed material provides additional strength to the honeycomb and adhesion for bonding to substrates such as the walls of the honeycomb and/or the facing sheets. The blowing agents should not produce the gasses at room temperature to ensure that the pellets are storage stable at room temperature.

The blowing agent may be a chemical blowing agent and may include one or more nitrogen containing groups such as amides, amines and the like. Examples of suitable blowing agents include azodicarbonamide, dinitrosopentamethylenetetramine, azodicarbonamide, dinitrosopentamethylenetetramine, 4,4,$_p$,oxy-bis-(benzenesulphonylhydrazide), trihydrazinotriazine and N, N,$_p$dimethyl-N,Ni-dinitrosoterephthalamide. An accelerator for the blowing agents may also be provided. Various accelerators may be used to lower the temperature at which the blowing agents form inert gasses. One preferred blowing agent accelerator is a metal salt, such as a metal oxide, for example zinc oxide. Other preferred accelerators include modified and unmodified thiazoles or imidazoles (ureas).

Another class of blowing agents are physical blowing agents such as the Expancel products marketed by Akzo-Nobel. Although these blowing agents are less preferred they consist of a polymeric particle with a volatile liquid in the centre. As the temperature is increased, the polymer shell softens and the vaporisation of the liquid inside the particle causes the polymer pellets to expand. In this way, a foamed product is produced.

The amounts of blowing agent and blowing agent accelerators that are used can vary widely depending upon the type of cellular structure desired, the desired amount of expansion of the pellet, the desired rate of expansion and the selected expansion temperature. Exemplary ranges for the total amount of blowing agents and blowing agent accelerators in the pellet range from about 0.001% by weight to about 5% by weight.

The pellet should expand by at least 50% in volume, preferably at least 100%, more preferably, at least 200% greater. The degree of expansion should be such that the pellets coalesce to form a uniform foam within the cell of the honeycomb. It is also preferred that the expanded volume is less than 400%, more typically less than 300%, even more typically less than 250% of the unexpanded volume of the pellet. The degree of expansion should be kept low in order to avoid excessive pressure build up which might damage the honeycomb structure or cause delamination or prevent lamination of one or more of the facing sheet or sheets.

Core-Shell Particles

Particles having a core-shell structure are a preferred component of the compositions used to produce the pellets used in the present invention. Such particles generally have a core comprised of a polymeric material having elastomeric or rubbery properties (i.e., a glass transition temperature less than about 0° C., e.g., less than about −30° C.) surrounded by a shell comprised of a non-elastomeric polymeric material (i.e., a thermoplastic or thermoset/crosslinked polymer having a glass transition temperature greater than ambient temperatures, e.g., greater than about 50° C.). For example, the core may be comprised of, for example, a diene homopolymer or copolymer (for example, a homopolymer of butadiene or isoprene, a copolymer of butadiene or isoprene with one or more ethylenically unsaturated monomers such as vinyl aromatic monomers, (meth)acrylonitrile, (meth)acrylates, or the like) while the shell may be comprised of a polymer or copolymer of one or more monomers such as (meth)acrylates (e.g., methyl methacrylate), vinyl aromatic monomers (e.g., styrene), vinyl cyanides (e.g., acrylonitrile), unsaturated acids and anhydrides (e.g., acrylic acid), (meth) acrylamides, and the like having a suitably high glass transition temperature. The polymer or copolymer used in the shell may have acid groups that are crosslinked ionically through metal carboxylate formation (e.g., by forming salts of divalent metal cations). The shell polymer or copolymer could also be covalently crosslinked through the use of monomers having two or more double bonds per molecule. Other elastomeric polymers may also be used for the core, including polybutylacrylate or polysiloxane elastomer (e.g., polydimethylsiloxane, particularly crosslinked polydimethylsiloxane). The particle may be comprised of more than two layers (e.g., a central core of one elastomeric material may be surrounded by a second core of a different elastomeric material or the core may be surrounded by two shells of different composition or the particle may have the structure soft core, hard shell, soft shell, hard shell). Either the core or the shell or both the core and the shell may be crosslinked (e.g., ionically or covalently), as described, for example, in U.S. Pat. No. 5,686,509. The shell may be grafted onto the core. The polymer comprising the shell may bear one or more different types of functional groups (e.g., epoxy groups, carboxylic acid groups) that are capable of interacting with other components of the compositions of the present invention. In other embodiments, though, the shell is free of functional groups capable of reacting with other components present in the composition. Typically, the core will comprise from about 50 to about 95 percent by weight of the particles while the shell will comprise from about 5 to about 50 percent by weight of the particles.

Preferably, the elastomeric particles are relatively small in size. For example, the average particle size may be from about 30 nm to about 120 nm. In certain embodiments of the invention, the particles have an average diameter of less than about 80 nm. In other embodiments, the average particle size is less than about 100 nm. For example, the core-shell particles may have an average diameter within the range of from 50 to about 100 nm.

Elastomeric particles having a core-shell structure are available from several commercial sources. The following core-shell particles are suitable for use in the present invention, for example: the core-shell particles available in powder form from Wacker Chemie under the tradename GENIOPERL, including GENIOPERL P22, P23, P52 and P53, which are described by the supplier as having crosslinked polysiloxane cores, epoxy-functionalized polymethylmethacrylate shells, polysiloxane content of about 65 weight percent, softening points as measured by DSC/DMTA of about 120° C., and a primary particle size of about 100 nm, the core-shell rubber particles available from Rohm & Haas under the tradename PARALOID, in particular the PARALOID EXL 2600/3600 series of products, which are grafted polymers containing a polybutadiene core upon which is grafted a styrene/methylmethacrylate copolymer and having an average particle size of ca. 0.1 to about 0.3 microns; the core-shell rubber particles sold under the tradename DEGALAN by Roehm GmbH or Roehm America, Inc. (e.g., DEGALAN 4899F, which is reported to have a glass transition temperature of about 95° C.); the core-shell rubber particles sold by Nippon Zeon under the tradename F351; and the core-shell rubber particles sold by General Electric under the tradename BLENDEX.

The use of these core shell rubbers provides toughness to the foamed and optionally cured pellet, irrespective of the temperature or temperatures used to cure the formulation. Many of the core-shell rubber structures available from Kaneka in the form of phase separated particles dispersed in epoxy resin are believed to have a core made from a copolymer of (meth)acrylate-butadiene-styrene, where butadiene is the primary component of the copolymer in the core. Other commercially available masterbatches of core-shell rubber particles dispersed in epoxy resins include GENIOPERL M23A (a dispersion of 30 wt % core-shell particles in an aromatic epoxy resin based on bisphenol A diglycidyl ether; the core-shell particles have an average diameter of ca. 100 nm and contain a crosslinked silicone elastomer core onto which an epoxy-functional acrylate copolymer has been grafted; the silicone elastomer core represents about 65 wt % of the core-shell particle), available from Wacker Chemie GmbH.

Typically, the composition from which the pellets are made may contain from 5 to 25 wt %, preferably from 8 to 20 wt %, elastomeric particles having a core-shell structure. Combinations of different core-shell particles may advantageously be used in the pellets. The core-shell particles may differ, for example, in particle size, the glass transition temperatures of their respective cores and/or shells, the compositions of the polymers used in their respective cores and/or shells, the functionalization of their respective shells, and so forth.

Toughening Agents

Toughening agents are preferably included in the compositions used to prepare the pellets used in this invention. Suitable toughening agents may be selected from a wide variety of substances, but generally speaking such materials are polymeric or oligomeric in character, and may have functional groups such as epoxy groups, carboxylic acid groups, amino groups and/or hydroxyl groups capable of reacting with the other components of the compositions, when the composition is cured by heating.

The epoxy-based prepolymers obtained by reacting one or more amine-terminated polymers such as amine-terminated polyethers and amino silane-terminated polymers with one or more epoxy resins represent a particularly preferred class of toughening agents. The epoxy resins useful for such purpose may be selected from among the epoxy resins described hereinabove, with particular preference being given to the diglycidyl ethers of polyphenols such as bisphenol A and bisphenol F (for example, having epoxy equivalent weights of from about 150 to about 1000). Mixtures of solid and liquid epoxy resins may be suitably employed.

The preparation of such epoxy-based prepolymers from amine-terminated polyethers is described, for example, in U.S. Pat. Nos. 5,084,532 and 6,015,865. Generally speaking, it will often be desirable to adjust the ratio of amine-terminated polyether epoxy resin being reacted such that there is an excess of epoxy groups relative to amine groups such that the latter functional groups are completely reacted (i.e., the epoxy-based prepolymer contains essentially no free amine groups). Mixtures of di- and trifunctional amine-terminated polyethers may be used. Amine-terminated polyethers containing both oxyethylene and oxypropylene repeating units (e.g., copolymers of ethylene oxide and propylene oxide, with the copolymers having a block, capped or random structure) may also be utilized as the amino-terminated polyether. Preferably, the amino-terminated polyether contains at least two amine groups per molecule. Preferably, the amine groups are primary amine groups.

Other suitable toughening agents include amorphous polysulfones, i.e., those polymers that contain predominately ether and sulfone groups interspersed between arylene residues. Such polysulfones, sometimes called polyethersulfones, may be prepared by the processes taught in U.S. Pat. No. 4,175,175, and particularly U.S. Pat. No. 3,647,751, for example.

Polysulfones containing ether and alkylene groups in addition to sulfone groups are predominately amorphous, and are suitable candidates for the practice of the subject invention. Such polysulfones (polyethersulfones) have glass transition temperatures Tg, of greater than 150° C., preferably greater than 175° C., and most preferably in excess of 190° C. The Tg of a preferred KM 180 amine terminated polyether sulfone (manufactured by Cytec Industries Inc., Woodland Park N.J.) is approximately 200° C.

Other toughners or impact modifiers known in the epoxy adhesive art may be used together with or in place of the aforementioned prereacts derived by reaction of amine-terminated polymers or amino silane-terminated polymers with epoxy resins. Generally speaking, such toughners and impact modifiers are characterized by having glass transition temperatures ranging from −30° C. to 300° C. Examples of such toughners and impact modifiers include, but are not limited to: reaction products of epoxy-reactive copolymers of butadiene (especially epoxy-reactive copolymers of butadiene with relatively polar comonomers such as (meth) acrylonitrile, (meth)acrylic acid, or alkyl acrylates, e.g., carboxyl-terminated butadiene-nitrile rubbers. Other examples include polyimides such as Matrimid 9725 supplied by Huntsman, Polyetherimides such as Ultem supplied by GE and others.

Mixtures of different auxiliary impact modifiers/toughening agents may be used. The amount of auxiliary impact modifier/toughening agent in the compositions used to produce the pellets used in the present invention may vary substantially but typically is from about 0.1 to about 20 wt %, e.g. from about 5 to about 15 wt %. In one embodiment, it is contemplated that the toughening agent is present from about 10% to about 15% by weight of the total.

In another embodiment, the thermosetting pellets used and provided herein include a toughening agent chosen from carboxy-terminated acrylonitrile-butadiene copolymer, polyamides, polyimides, and amido-amides. The carboxy-terminated acrylonitrile-butadiene copolymer can include, for example, NIPOL 1472, whereas the polyamide can include, for example, nylon. Suitable polyimides are known to those of ordinary skill in the art and include, for example, those described in detail in U.S. Pat. No. 5,605,745. Particularly preferred are those polyimides which, because of the asymmetry of the dianhydride or diamine, particularly the latter, possess a lesser degree of crystallinity or are wholly amorphous. Polyimides based on BTDA and AATI are preferred. Such polyimides are available commercially under the trademark MATRIMID® 5218 from the Ciba-Geigy Corporation, and have an inherent viscosity of >0.62 dl/g when measured at 0.5 wt % concentration in N-methylpyrollidone at 25° C. The molecular weight of these most preferred polyimides is greater than 20,000 Daltons, preferably greater than 50,000 Daltons, and most preferably in the range of about 100,000 Daltons.

Epoxy Elastomer Adduct

An epoxy elastomer adduct may be included in the formulation to import flexibility to the foamed material derived from the pellets and to provide the ability to initiate plastic deformation. Various epoxy/elastomer adducts may be employed. The epoxy/elastomer hybrid or adduct may be included in an amount of up to about 50% by weight of the formulation. The epoxy elastomer adduct is approximately at least 5%, more typically at least 7% and even more typically at least 10% by weight of the formulation and more preferably about 12% to 40%. The elastomer-containing adduct may be a combination of two or more particular adducts and the adducts may be solid adducts, semi-solids, at a temperature of 23° C. or may also be combinations thereof. A solid adduct is preferred in one preferred embodiment the adduct is composed of substantially entirely (i.e., at least 70%, 80%, 90% or more) of one or more adducts that are solid at a temperature of 23° C. We have found unexpectedly that when the adduct is used in the pellets together with a core/shell polymer desirable adhesive performance of the foamed pellets can be achieved over a wide range of temperatures and that the adduct imparts high temperature stability to the adhesive since there is little undesirable lowering of the Tg of the cured and foamed pellets.

The adduct itself generally includes about 1:5 to 5:1 parts of epoxy to elastomer, and more preferably about 1:3 to 3:1 parts of epoxy to elastomer. More typically, the adduct includes at least about 10%, more typically at least about 20% and even more typically at least about 40% elastomer and also typically includes not greater than about 60%, although higher or lower percentages are possible. The elastomer compound suitable for the adduct may be a thermosetting elastomer, although not required. Exemplary elastomers include, without limitation, natural rubber, styrene-butadiene rubber, polyisoprene, polyisobutylene, polybutadiene, isoprene-butadiene copolymer, neoprene, nitrile rubber (e.g., a butyl nitrile, such as carboxy-terminated butyl nitrile), butyl rubber, polysulfide elastomer, acrylic elastomer, acrylonitrile elastomers, silicone rubber, polysiloxanes, polyester rubber, diisocyanate-linked condensation elastomer, EPDM (ethylene-propylene diene rubbers), chlorosulphonated polyethylene, fluorinated hydrocarbons and the like. In one embodiment, recycled tire rubber is employed. Examples of additional or alternative epoxy/elastomer or other adducts suitable for use in the present invention are disclosed in United States Patent Publication 2004/0204551.

The elastomer-containing adduct is included to modify structural properties of the cured foam such as strength, toughness, stiffness, flexural modulus, and the like, halogenated elastomer are particularly useful.

Polymer or Copolymer

Depending upon the use to which the pellets are to be put, the pellets may be based on or contain polymers or copolymers, the pellets may include one or more polymers or copolymers which may or may not contain functional groups, which can include a variety of different polymers, such as thermoplastics, elastomers, plastomers and combinations thereof or the like. For example, and without limitation, polymers that might be used include halogenated polymers, polycarbonates, polyketones, polyurethanes, polyesters, silanes, sulfones, allyls, olefins, styrenes, acrylates, polymethacrylates, epoxies, silicones, phenolics, rubbers, polyphenylene oxides, terphthalates, acetates (e.g., EVA), acrylates, methacrylates (e.g., ethylene methyl acrylate polymer) or mixtures thereof. Other potential polymeric materials may be or may include, without limitation, polyolefin (e.g., polyethylene, polypropylene) polystyrene, polyacrylate, poly(ethylene oxide), poly(ethyleneimine), polyester, polysiloxane, polyether, polyphosphazine, polyamide, polyimide, polyisobutylene, polyacrylonitrile, polyvinyl chloride), poly(methyl methacrylate), polyvinyl acetate), poly(vinylidene chloride), polytetrafluoroethylene, polyisoprene, polyacrylamide, polyacrylic acid.

When used, these polymers can comprise a small portion or a more substantial portion of the pellet forming material. When used, the one or more additional polymers preferably comprises about 0.1% to about 50%, more preferably about 1% to about 20% and even more preferably about 2% to about 10% by weight of the pellet.

In certain embodiments, it may be desirable to include one or more thermoplastic polyethers and/or thermoplastic epoxy resins. When included, the one or more thermoplastic polyethers preferably comprise between about 1% and about 90% by weight of the pellet, more preferably between about 3% and about 60% by weight of the pellet and even more preferably between about 4% and about 25% by weight of the pellet. As with the other materials, however, more or less thermoplastic polyether may be employed depending upon the intended use of the pellets.

The thermoplastic polyethers typically include pendant hydroxyl moieties. The thermoplastic polyethers may also include aromatic ether/amine repeating units in their backbones. The thermoplastic polyethers preferably have a melt index between about 5 and about 100, more preferably between about 25 and about 75 and even more preferably between about 40 and about 60 grams per 10 minutes for samples weighing 2.16 Kg at a temperature of about 190° C. The thermoplastic polyethers may have higher or lower melt indices depending upon their intended application. Preferred thermoplastic polyethers include, without limitation, polyetheramines, poly(amino ethers), copolymers of monoethanolamine and diglycidyl ether, combinations thereof or the like.

Preferably, the thermoplastic polyethers are formed by reacting an amine with an average functionality of 2 or less (e.g., a difunctional amine) with a glycidyl ether (e.g., a diglycidyl ether). As used herein, the term difunctional amine refers to an amine with an average of two reactive groups (e.g., reactive hydrogens).

The thermoplastic polyether may be formed by reacting a primary amine, a bis(secondary) diamine, a cyclic diamine, a combination thereof or the like (e.g., monoethanolamine) with a diglycidyl ether or by reacting an amine with an epoxy-functionalized poly(alkylene oxide) to form a poly(amino ether). Alternatively, the thermoplastic polyether is prepared by reacting a difunctional amine with a diglycidyl ether or diepoxy-functionalized poly(alkylene oxide) under conditions sufficient to cause the amine moieties to react with the epoxy moieties to form a polymer backbone having amine linkages, ether linkages and pendant hydroxyl moieties. Optionally, the polymer may be treated with a monofunctional nucleophile which may or may not be a primary or secondary amine.

Additionally, it is contemplated that amines (e.g., cyclic amines) with one reactive group (e.g., one reactive hydrogen) may be employed for forming the thermoplastic polyether. Advantageously, such amines may assist in controlling the molecular weight of the thermoplastic ether formed.

Examples of preferred thermoplastic polyethers and their methods of formation are disclosed in U.S. Pat. Nos. 5,275,853; 5,464,924 and 5,962,093. Advantageously, the thermoplastic polyethers can provide the foamed pellets with various desirable characteristics such as desirable physical and chemical properties for a wide variety of applications.

A phenoxy resin may also be included in the formulation used to produce the pellets of this invention. Phenoxy resins are high molecular weight thermoplastic condensation products of bisphenol A and epichloro-hydrin and their derivatives. Typically the phenoxy resins that may be employed are of the basic formula

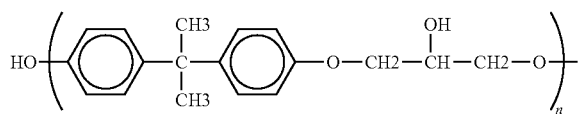

where n is typically from 30 to 100 preferably from 50 to 90. Modified phenoxy resins may also be used. Examples of phenoxy resins that may be used are the products marketed by Inchem Corp. Examples of suitable materials are the PKHB, PKHC, PKHH, PKHJ, PKHP-pellets and powder. Alternatively phenoxy/polyester hybrids and epoxy/phenoxy hybrids may be used. In order to enhance the production of the pellets the phenoxy resin may be supplied to the other components as a solution. While any solvent may be used it is particularly preferred to use a liquid epoxy resin as the solvent as this can also contribute to the adhesive properties of the foamed pellet. We prefer to use more than 30% by weight of the phenoxy resin based on the weight of the pellet.

Although not required, the formulation may include one or more ethylene polymers or copolymers such as ethylene acryllate copolymers, ethylene vinyl acetate copolymers. Ethylene methacrylate and ethylene vinyl acetate are two preferred ethylene copolymers.

It may also be desirable to include a reactive polyethylene resin that is modified with one or more reactive groups such as glycidyl methacrylate or maleic anhydride. Examples of such polyethylene resins are sold under the tradename LOTADER® (e.g., LOTADER AX 8900) and are commercially available from Arkema Group.

The pellets of this invention may contain other ingredients such as one or more of the following
i) filler;
ii) flow control materials;
iii) nano particles and
iv) pigments.

Filler

The formulations from which the pellets used in this invention are made may also include one or more finely divided fillers, including but not limited to particulate materials (e.g., powder), beads, microspheres such as Zeospheres available from Zeelan Industries, or the like. Preferably the filler includes a material that is generally non-reactive with the other components present in the pellet however, the surfaces may be treated to improve adhesion or compatibility with the other materials. While the fillers may generally be present to take up space at a relatively low weight and cost, it is contemplated that the fillers may also impart properties such as strength and impact resistance to the foamed pellets.

Examples of fillers that may be used include silica, diatomaceous earth, glass, clay (e.g., including nanoclay), talc, pigments, colorants, glass beads or bubbles, glass, carbon or ceramic fibres, nylon or polyamide fibres (e.g., Kevlar), antioxidants, and the like. The clays that may be used as fillers may include clays from the kaolinite, illite, chloritem, smecitite or sepiolite groups, which may be calcined. Examples of suitable fillers include, without limitation, talc, vermiculite, pyrophyllite, sauconite, saponite, nontronite, montmorillonite or mixtures thereof. The clays may also include minor amounts of other ingredients such as carbonates, feldspars, micas and quartz. The fillers may also include ammonium chlorides such as dimethyl ammonium chloride and dimethyl benzyl ammonium chloride. Titanium dioxide might also be employed.

In one preferred embodiment, one or more mineral or stone type fillers such as calcium carbonate, sodium carbonate or the like may be used as fillers. In another preferred embodiment, silicate minerals such as mica may be used as fillers.

When employed, the fillers range from 10% or less to 70% or greater by weight of the formulation from which the pellets are made. According to some embodiments, the formulation may include from about 0% to about 3% by weight, and more preferably slightly less that 1% by weight clays or similar fillers. Powdered (e.g. about 0.01 to about 50, and more preferably about 1 to 25 micron mean particle diameter) mineral type filler can comprise between about 5% and 70% by weight, more preferably about 10% to about 50% by weight.

Other Components and Additives

Other additives, agents or performance modifiers may also be included in the formulation from which the pellets are made as desired, including but not limited to an antioxidant, a UV resistant agent, a heat stabilizer, a colorant, a processing aid, a lubricant, and a reinforcement. Liquid polysufides particularly epoxidized polysulfides may be used to improve the environmental exposure of the pellets such as exposure to humidity and salt water.

When determining appropriate components for the pellets, it is important to form the pellet such that it will only activate (e.g., foam and optionally cure) at appropriate times or temperatures. For instance, the material should not be reactive at ambient temperature and the pellets should become activated at higher processing temperatures. As an example, the pellets may be activated to foam and optionally cure at temperatures such as those encountered in a press or oven used in the manufacture of honeycomb panels. Typical temperatures encountered range up to about 250° C. or higher typically 100° C. to 200° C. more typically 120° C. to 160° C.

The formulation used to make the pellets used in the present invention is preferably dry to the touch at ambient temperature so that the pellet can be stored, exposed and transported without pre-reaction and without picking up dust and dirt. Additionally the formulations are preferably thermoplastic at intermediate temperatures above ambient temperature and below the temperature at which they will expand and optionally cure. This enables the formulation to be melted and extruded to form the pellets without any undesirable pre foaming or precuring occurring. It is therefore preferred that the formulation has a melting point in the range 80° C. to 100° C. The pellets may then be obtained by the extrusion of the formulation through an appropriate sized die. After extrusion and solidification the pellets may be sieved to remove any oversized particle, to obtain the particle size diameter in the range of 0.5 mm to 0.9 mm. If the pellets are larger than this then they will not pack well when they are placed within the cells of a honeycomb structure and it will not be possible to obtain a foam with a uniform cell structure.

If however the particles are smaller than this they may agglomerate in the dry state and again not pack in a uniform manner into the cells of a honeycomb which typically have a largest transverse dimension in the range of 3 to 6 mm, typically 3 to 5 mm and which have a height of from about 8 to 15 mm particularly 9 to 11 mm. We have found that providing the pellets are substantially spherical and are preferably of an average diameter of from 0.5 to 0.9 mm the pellets may be readily dispensed as a dry free flowing mass into the cells of the honeycomb and they will pack within the cells of the honeycomb structure in a manner that upon foaming results in a foam with substantially uniform mechanical properties across those of the cells of the honeycomb that are filled with the foam. This is particularly so if at least 80% of the pellets have a diameter in this range.

The pellets may be introduced into the cells of a honeycomb structure by pouring the pellets as a free flowing stream perhaps from a hopper that traverses the open ends of the cells of the honeycomb.

In the preferred process the honeycomb is placed on top of a facing sheet, the pellets are dispensed into the cells of the honeycomb, a second facing sheet is placed on top of the honeycomb and the structure is heated, typically in a mould or a press to cause the pellets to foam and cure so that the foam fills the cells of the honeycomb and adheres to the walls of the cells of the honeycomb and to the facing sheets, In a preferred embodiment the facing sheers are prepregs (fibre reinforcement in a curable matrix) and the pellets are selected so that they will foam under the conditions that cause the prepregs to cure. Typical prepregs include glass fibre, carbon fibre or aramid fibre in a curable matrix such as a curable epoxy resin.

The pellets may be supplied to selected areas of the honeycomb or they may be supplied across the entire honeycomb according to the use to which the final panel is to be put. For example the foam may be required to provide local reinforcement to areas of the honeycomb panel where attachments such as handles, hinges and/or locks are to be provided, for example in aircraft uses such as the doors for overhead luggage compartments which require handles and hinges. Alternatively the foam may be required over a larger area if it is to provide more general strengthening. In all uses in aircrafts it is important that the foam has fire retardant properties.

The invention is illustrated by the attached Figures in which

FIG. 1 shows the spherical pellets based on a thermosetting epoxy resin (1) of average diameter about 0.6 mm compared with conventional oval granules (2) of size about 4 mm.

FIG. 2 shows the pellets (1) being fed into a hopper (3) and dispensed into the cells of a honeycomb structure (4).

FIG. 4 shows the honeycomb (4) with some cells (5) filled with the unfoamed pellets (1).

FIG. 5 shows the honeycomb of FIG. 4 after the pellets have been foamed (6).

Figure 1:
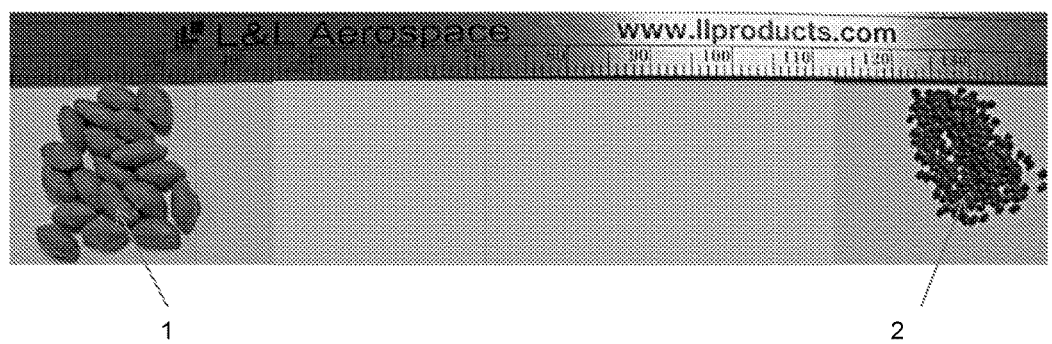
FIG. 1 shows the pellets of the invention.
Figure 2:
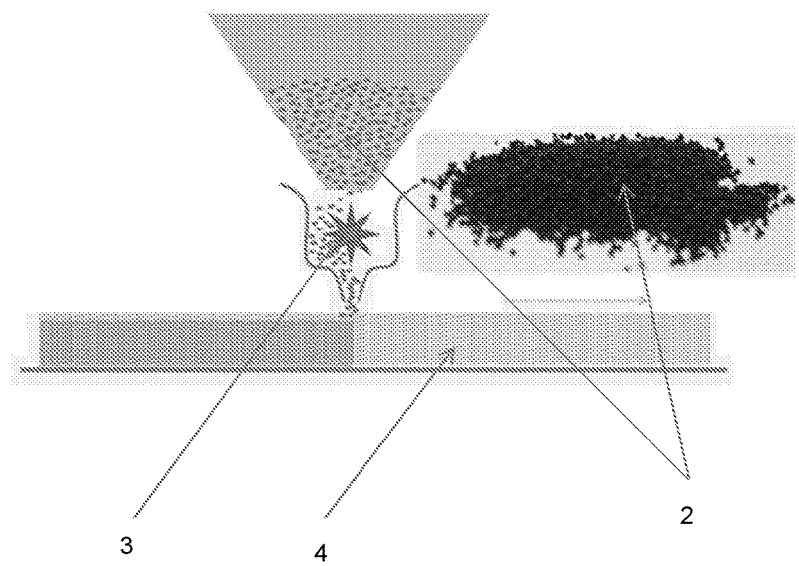
FIG. 2 shows how the pellets of the invention may be dispensed by pouring into the cells of a honeycomb structure.
Figure 3:
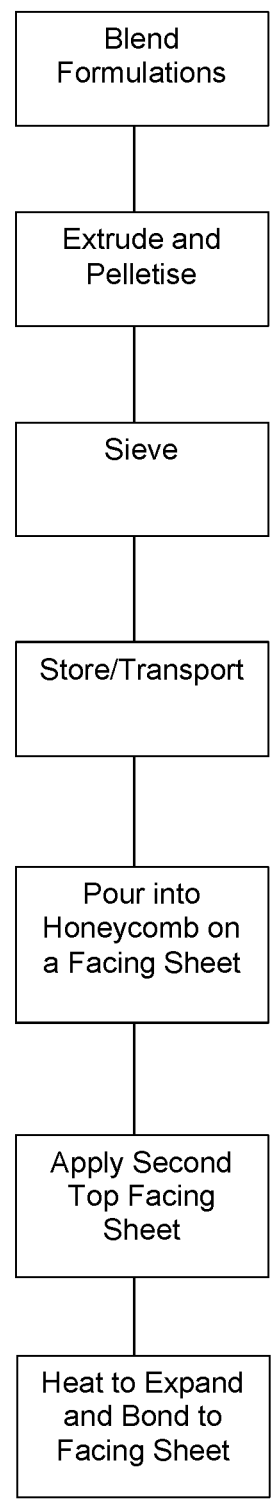
FIG. 3 is a flow chart of a honeycomb manufacturing process.
Figure 4:
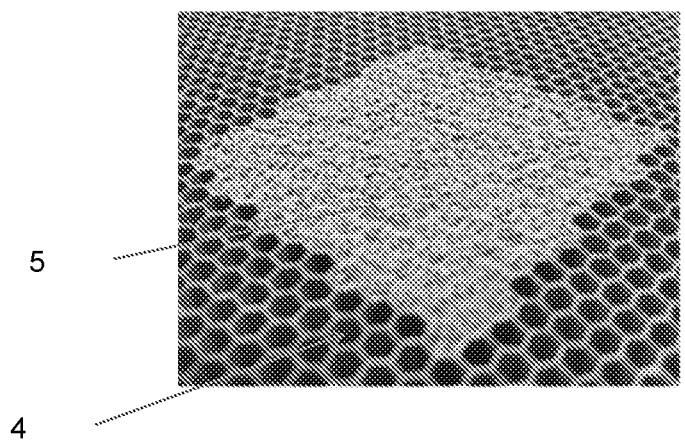
FIG. 4 shows a honeycomb with a section of the cells filled with pellets.
Figure 5:
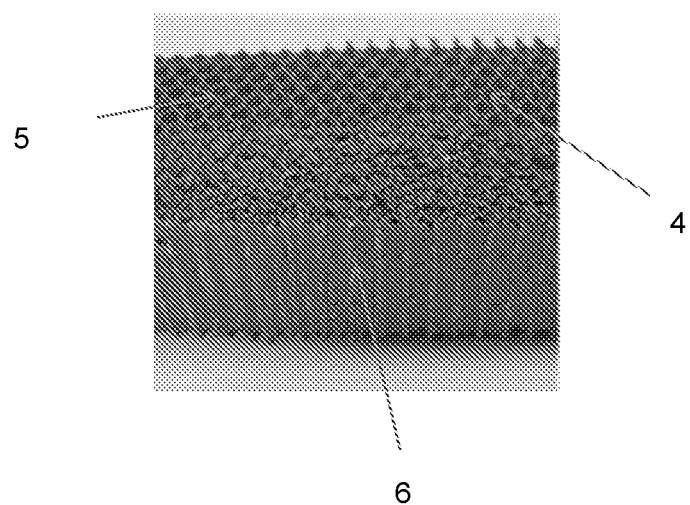
FIG. 5 shows a honeycomb containing a foam derived by heating and curing the pellets within the cells of the honeycomb.

The invention claimed is:

1. Substantially spherical pellets for strengthening a sandwich panel comprising a honeycomb core wherein the pellets:
   i) comprise a polymer and a thermally activated blowing agent;
   ii) have an average diameter in the range of 0.5 mm to 0.9 mm;
   iii) include a thermally activated curing agent;
   wherein the substantially spherical pellets are dry, free flowing, and readily pourable and the substantially spherical pellets upon foaming in the honeycomb structure, results in a foam with substantially uniform mechanical properties throughout the foam.

2. The pellets according to claim 1 in which the polymer is an epoxy resin.

3. The pellets according to claim 1 in which at least 80% of the pellets have a diameter in the range of 0.5 mm to 0.9 mm.

4. A honeycomb structure in which at least one or more cells are filled by a foam obtained by providing the substantially spherical pellets of claim 1 that have been heated to cause the pellets to foam.

5. The honeycomb structure according to claim 4 in which the polymer is a thermosetting resin.

6. The honeycomb structure according to claim 5 wherein the thermosetting resin is an epoxy resin.

7. The honeycomb structure according to claim 4 in which at least 80% of the pellets have a diameter in the range 0.5 mm to 0.9 mm.

8. The honeycomb structure according to claim 4 provided with a facing sheet on at least one surface.

9. The honeycomb structure according to claim 8 wherein the facing sheets on the at least one surface comprise a prepreg of fibres in a curable matrix.

10. The honeycomb structure according to claim 9 in which the curable matrix is cured at the temperature used to foam the pellets.

11. The honeycomb structure according to claim 9 in which the curable matrix is an epoxy resin.

12. Substantially spherical pellets of average diameter in the range of 0.5 mm to 0.9 mm wherein the pellets comprise a thermosetting epoxy resin, a thermally activated blowing agent and a thermally activated curing agent for the thermosetting epoxy resin; and
   wherein the substantially spherical pellets are readily dispensed as a dry free flowing state and are substantially free of agglomeration in the dry free flowing state.

13. Substantially spherical pellets according to claim 12 wherein at least 80% of the pellets have a diameter in the range of 0.5 mm to 0.9 mm.

* * * * *